(12) United States Patent
Blankenship

(10) Patent No.: US 6,317,956 B1
(45) Date of Patent: Nov. 20, 2001

(54) METHOD AND APPARATUS FOR REMOVING AN AIRCRAFT STRUT FROM AN AIRCRAFT HAVING RETRACTABLE LANDING GEAR

(76) Inventor: George R. Blankenship, 5827 Danny Kay Dr., San Antonio, TX (US) 78240

( * ) Notice: Subject to any disclaimer, the term of this patent is extended or adjusted under 35 U.S.C. 154(b) by 0 days.

(21) Appl. No.: 09/329,888

(22) Filed: Jun. 11, 1999

(51) Int. Cl.⁷ ............................... B23P 19/04; B66F 3/24
(52) U.S. Cl. .................... 29/426.5; 29/252; 254/93 R; 254/93 VA; 254/133 R
(58) Field of Search .................... 29/252, 426.5; 254/93 R, 93 VA, 133 R

(56) References Cited

U.S. PATENT DOCUMENTS

| | | | |
|---|---|---|---|
| 2,719,695 | * | 10/1955 | McKee . |
| 3,638,887 | * | 2/1972 | Thurston . |
| 3,710,427 | * | 1/1973 | Doty . |
| 3,797,094 | * | 3/1974 | Combs et al. . |
| 3,815,202 | * | 6/1974 | Squires . |
| 5,129,136 | * | 7/1992 | Richardson . |

* cited by examiner

Primary Examiner—S. Thomas Hughes
Assistant Examiner—Eric Compton

(57) ABSTRACT

An apparatus for removing struts from pivoting landing gear supports of a plane having retractable landing gear includes a stiffening anchor attached to a distal end of the strut wherein the distal end is the end at which the wheel is attached. The apparatus further includes a press collar that slidingly contains the strut within it. In between the press collar and the stiffening anchor is a hydraulic ram that provides up to twenty thousand pounds of urging pressure. The urging pressure provided by the hydraulic ram is axially translated into the aircraft pivoting landing gear support and into the landing gear strut in an opposite axial direction to remove the strut. The stiffening anchor is formed to fit the strut and to distribute the urging pressure in a way that does not damage the strut. A method of removing a strut seized to a pivotal landing gear support of a plane having retractable landing gear includes placing the hydraulic strut removing tool against the strut, securing it to the strut, and applying hydraulic pressure until the strut is urged free.

19 Claims, 3 Drawing Sheets

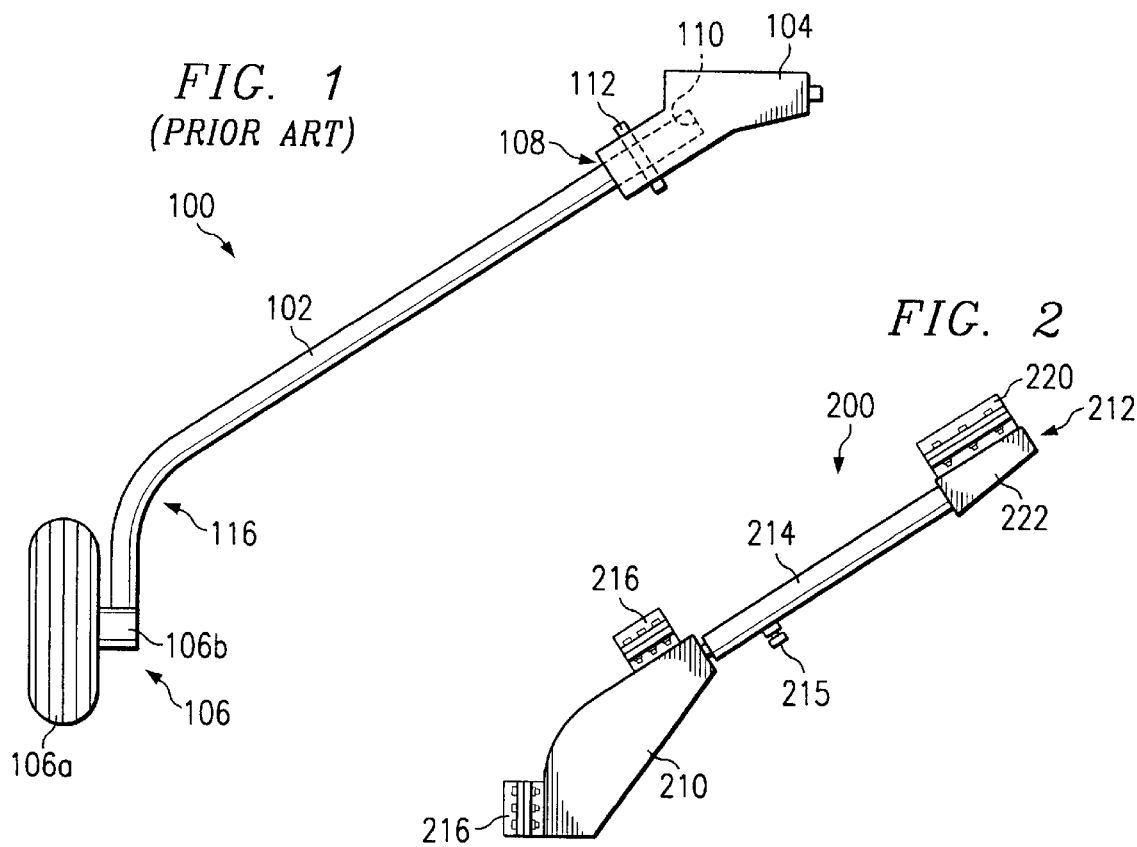
FIG. 1 (PRIOR ART)
FIG. 2
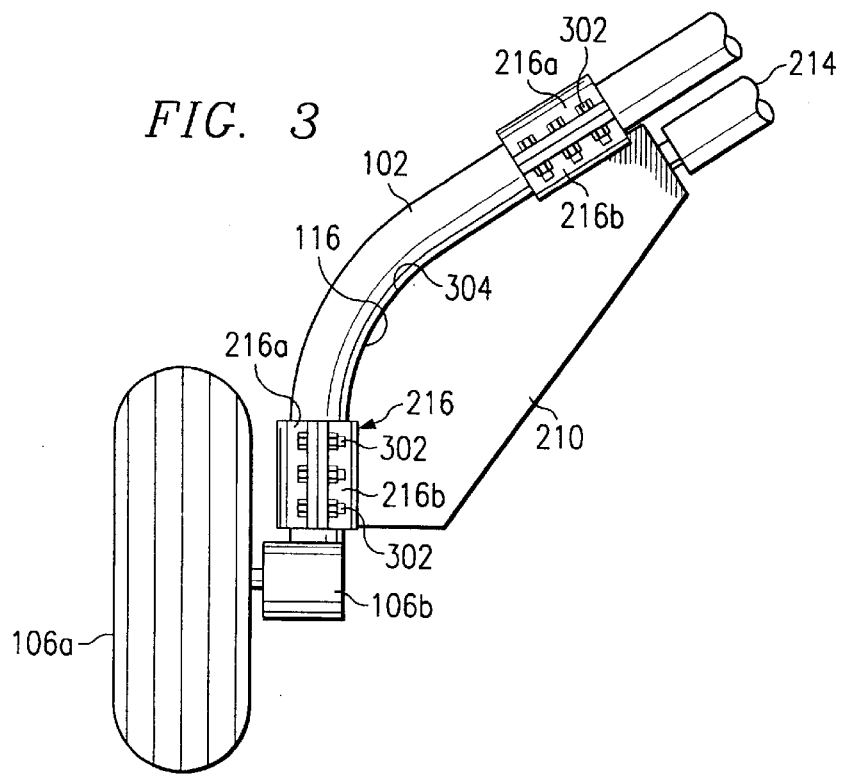
FIG. 3

METHOD AND APPARATUS FOR REMOVING AN AIRCRAFT STRUT FROM AN AIRCRAFT HAVING RETRACTABLE LANDING GEAR

BACKGROUND

1. Field of the Invention

The present invention relates generally to tools and more particularly to a method and an apparatus for removing landing gear struts from aircrafts having retractable landing gear.

2. Description of the Related Art

Retractable aircraft landing gear struts periodically need to be removed for maintenance. One reason is that retractable landing gear systems typically include hydraulic assemblies that, over time, require servicing to maintain proper fluid and pressure levels.

Maintenance of the hydraulic landing gear assemblies is required only once every few years. Other than servicing the strut to maintain the hydraulic retractable landing gear system, the struts are not usually removed. Accordingly, some struts are not removed from their aircraft for many years. While the aircraft strut is left untouched for many years, most aircraft are occasionally and sometimes frequently exposed to damp or wet environmental conditions. Some aircraft are even usually left out in the weather most of the time. Accordingly, without proper maintenance, some aircraft parts collect moisture that often causes corrosion and its undesirable effects.

The problem is especially acute for some small and older aircraft having a specific type of retractable landing gear strut. For these aircraft, corrosion often causes the landing gear strut to become bonded or seized to a pivoting landing gear support. The pivoting landing gear support is the device in a landing gear system that receives and holds the landing gear strut into place. By design, only removable retaining bolts, pins or springs (collectively "pins") are used to hold a landing gear strut in place. With corrosion that commonly develops between the landing gear strut and the pivoting landing gear support, however, the retaining pins may not be solely responsible for holding the strut in place. Thus, the struts are very difficult to remove even after retaining bolts or pins are removed.

Whenever a landing gear strut becomes seized by corrosion and the strut must be removed for servicing, a challenge is presented for economically removing the strut without damaging it. Occasionally, extreme amounts of force are required to grip the strut and to break it free from the pivoting landing gear support. Sometimes, aircraft mechanics apply significant force to the strut for prolonged periods to try to break it free from the corrosive grip of the landing gear support.

Even if the mechanic is successful in removing the landing gear strut, a mechanic frequently spends as much as eight hours trying to remove the strut without damaging it or the aircraft. Moreover, given that aircraft repair labor rates can approach $100 per hour at the time of this application, the labor cost for merely removing a strut can exceed $800.

Damaging the strut or the airplane or its components is common for experienced aircraft repair mechanics while trying to remove a strut seized by corrosion. If the strut or aircraft is damaged as often happens, however, the cost of trying to remove the strut can exceed thousands of dollars in parts and labor. Consequentially, properly servicing an aircraft's landing gear assembly is unduly expensive.

Thus, there exists a need in the art for a tool that can quickly remove an aircraft strut, and in particular, a retractable aircraft landing gear strut for certain models having a pivoting landing gear support and mating strut that are subject to the aforementioned problems, without damaging either the strut or the airplane and without requiring significant levels of effort. In general, there is need for a tool and a method to economically remove the struts to facilitate and encourage proper maintenance of the aircraft landing gear systems.

SUMMARY OF THE INVENTION

The problems outlined above are in large part solved by the present invention in which a hydraulic aircraft strut removal tool is formed for integrally and matingly attaching to an aircraft strut of a specified aircraft and for urging the strut in an outward direction relative to the aircraft pivoting landing gear support that holds the strut in place. Moreover, the hydraulic tool is formed to distribute necessary force to free the strut from the corrosive grip of the landing gear support while, at the same time, applying significant force to free the strut.

More specifically, a first end of the tool system matingly and securely attaches to a distal end of the strut while a second end of the tool system loosely and slidingly attaches to a proximate end of the strut. The first end of the tool includes a stiffening anchor that securely grips and distributes force supplied by the hydraulic tool along a curved portion of the landing gear strut. The stiffening anchor, by distributing the pressure applied by the hydraulic tool, prevents excessive force from being applied to anyone point on the strut thereby avoiding damage to the strut.

The second end of the tool includes a press collar that not only slidingly attaches to and contains the strut, but also that engages a rigid aircraft portion to press against it to remove the strut. By way of example, the press collar presses against a pivoting landing gear support that is for receiving and holding the strut into place.

Between the stiffening anchor and the press collar is an urging mechanism to urge the stiffening anchor away from the press collar. Accordingly, the press collar slidingly applies pressure against the pivoting landing gear support whenever the urging mechanism provides urging pressure.

In the described embodiment of the invention, the urging mechanism comprises a hydraulic ram that receives hydraulic liquid from a hydraulic liquid source, by way of example, from a manual hydraulic pump. Upon receipt of the hydraulic liquid from the hydraulic liquid source, the urging mechanism expands creating an outward urging pressure of up to 20,000 pounds.

A method of the present invention includes fixedly attaching a first end of a hydraulic tool to a distal and curved end of a landing gear strut. Additionally, a second end of the hydraulic tool is slidingly attached against a proximate end of the landing gear strut. After that, hydraulic fluid is supplied to a hydraulic ram portion of the hydraulic tool to cause it to exert an outward pressure on the distal end of the landing gear strut relative to the pivoting landing gear support.

The method further includes continuing to supply hydraulic liquid from the hydraulic liquid source to continue increasing outward pressure until the strut is urged free or until twenty thousand pounds of outward pressure is applied to the strut. If the strut still does not come free, the strut is manipulated as known by those skilled in the art to cause the strut to break free.

While the described embodiment includes using a hydraulic ram that can provide up to twenty thousand pounds of pressure, the invention also includes using hydraulic rams that can provide greater or lesser amounts of urging pressure. For example, a thirty thousand pound (15 ton) hydraulic ram may be used instead of a twenty thousand pound (10 ton) hydraulic ram.

These and other aspects of the present invention will become apparent with further reference to the drawings and specification that follow.

BRIEF DESCRIPTION OF THE DRAWINGS

A better understanding of the present invention can be obtained when the following detailed description of the described embodiments is considered with the following drawings, in which:

FIG. 1 is a front perspective view of a landing gear assembly including strut being held in place by a Cessna pivoting landing gear support;

FIG. 2 is a side perspective view of a hydraulic aircraft strut removal tool according to a preferred embodiment of the invention;

FIG. 3 is a front perspective view illustrating a stiffening anchor 210 of a hydraulic aircraft strut removal tool 200 attached to a landing gear strut 102 according to a preferred embodiment of the invention;

DETAILED DESCRIPTION OF THE DRAWINGS

Figure 4:
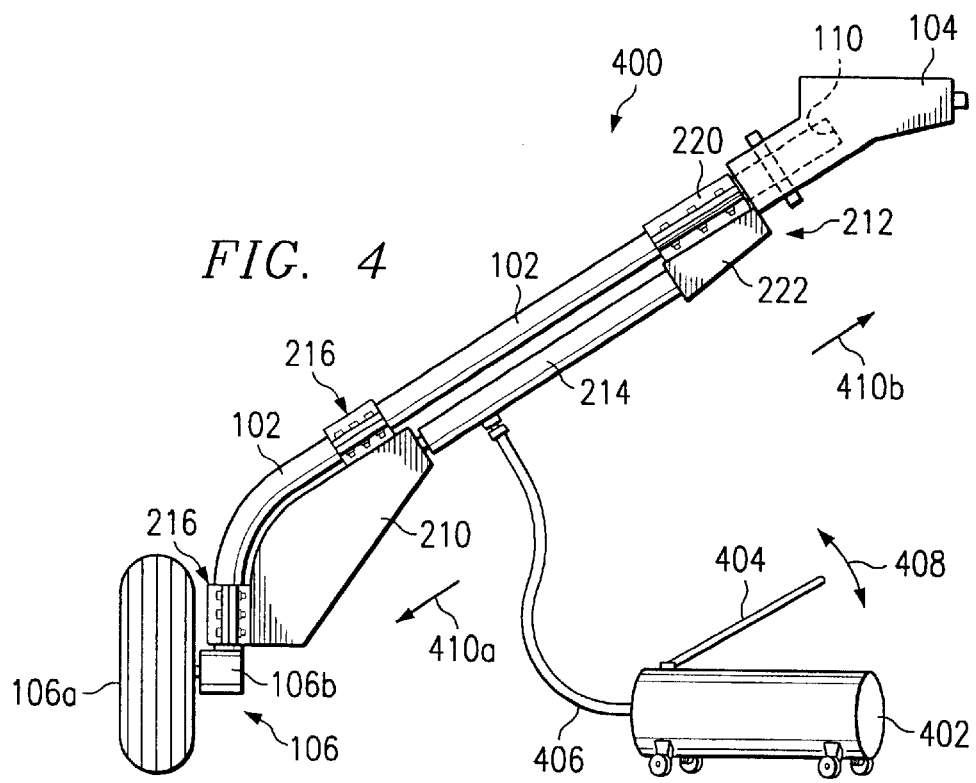
FIG. 4 is a functional diagram of a landing gear assembly and a hydraulic aircraft strut removal tool system according to a preferred embodiment of the invention.

FIG. 1 is a front perspective view of a landing gear assembly including a strut being held in place by a pivoting landing gear support. Referring now to FIG. 1, a landing gear assembly 100 includes a landing gear strut 102 that is being held in place by a pivoting landing gear support 104 at a proximate end of the strut 102. A wheel assembly 106 is shown at a distal end of strut 102 for illustrative purposes. Wheel assembly 106 includes a wheel 106a and a landing gear hub 106b.

Further, as is apparent from FIG. 1, landing gear support 104 forms an aperture 108 for integrally receiving strut 102. The formed aperture 104 has a specified depth and ends in a receptacle end 110 against which the strut 102 abuts while being held by landing gear support 104. Further as may be seen, strut 102 is held in place by a pin 112 that slidingly engages both strut 102 and landing gear support 104 when it is in place. At a lower end of strut 102, a landing gear hub 106b rotatably attaches wheel assembly 106 to landing gear strut 102. Finally, as may be seen, landing gear strut 102 includes an inner curved portion shown generally at 116. Inner curved portion 116 is formed to cause wheel 106a of wheel assembly 106 to be vertically aligned.

FIG. 2 is a side perspective view of a hydraulic aircraft strut removal tool according to a preferred embodiment of the invention. Referring now to FIG. 2, the hydraulic aircraft strut removal tool 200 includes a stiffening anchor 210, a sliding press collar 212 and a hydraulic ram 214 that is mechanically connected to and between stiffening anchor 210 and sliding press collar 212. In an alternate embodiment, ram 214 is integrally formed with and between anchor 210 and collar 212. Hydraulic ram 214 includes a connector valve 215 that is for receiving hydraulic fluid from a hydraulic fluid source (not shown in FIG. 2) for actuating hydraulic ram 214 to create an outward urging pressure.

Stiffening anchor 210 includes a pair of clamps 216 that are for securely clamping stiffening anchor 210 to landing gear strut 102. In the preferred embodiment, clamps 216 are formed at opposite ends of stiffening anchor 210. In the described embodiment, clamps 216 are formed to attach to landing gear strut 102 at each end of inner curved portion 116. Stated differently, the clamps 216 are formed on stiffening anchor 210 not to attach to the inner curved portion 116 of strut 102. As a typical diameter of a landing gear strut 102 near the landing gear hub 106b is approximately 1.48 inches, the clamps 216 are formed to define a channel having an interior diameter that is slightly less 1.48 inches. Accordingly, the landing gear strut 102 is securely gripped when the clamp 216 is secured to the landing gear strut as will be further described below.

The distance between landing gear hub 106b and pivoting landing gear support 104 is approximately thirty-three inches. Accordingly, hydraulic aircraft strut removal tool 200 is formed to fit within this thirty-three inch dimension in a contracted condition and must be able to expand beyond this thirty-three inch dimension.

Continuing to examine FIG. 2, hydraulic aircraft strut removal tool 200 includes a sliding press collar 212 at the second end of the hydraulic aircraft strut removal tool 200. Sliding press collar 212 includes a sliding strut connector 220 for loosely and slidingly connecting the sliding press collar 212 to landing gear strut 102.

In general, sliding strut connector 220, when bolted shut by a plurality of nut and bolt pairs, forms a channel portion for containing landing gear strut 102. The structure of sliding strut connector 220 is similar to clamp 216. The primary difference is that sliding strut connector 220 is formed to define a channel that has a diameter that is larger than the diameter of the strut in the area where the sliding strut connector 220 will be attached to the strut.

More specifically, the landing gear strut 102 has a typical diameter of approximately 2.15 inches at the proximate end of the strut, namely, at the end that attaches to the pivoting landing gear support 104. Sliding strut connector 220 is formed to slidingly hold landing gear strut 102. To achieve this, sliding strut connector 220 defines a channel having an internal diameter that exceeds 2.15 inches. By having a channel whose internal diameter exceeds the landing gear strut 102 diameter at the proximate end of the strut, landing gear strut 102 can slide through sliding strut connector 220 freely.

In contrast, as previously discussed, clamps 216 are formed to define a channel having a diameter that is slightly smaller than the diameter of the distal end of landing gear strut 102. This allows the clamps 216 to grip landing gear strut 102 securely.

Sliding press collar 212 also includes an end for engaging and pressing against the pivoting landing gear support 104. Sliding press collar 212 further includes a press sleeve 222 that is for translating outward pressure supplied by hydraulic ram 214 to the end of sliding press collar 212 and against the pivoting landing gear support 104.

FIG. 3 is a front perspective view illustrating a stiffening anchor 210 of a hydraulic aircraft strut removal tool 200 attached to a landing gear strut 102 according to a preferred embodiment of the invention. Referring now to FIG. 3, stiffening anchor 210 also includes an outer curved portion 304. Outer curved portion 304 is formed to have a curvature that matches the curvature of inner curved portion 116 of landing gear strut 102 of FIG. 1. When actuated to urge strut 102 out of pivoting landing gear support 104, outer curved portion 304 abuts against inner curved portion 116. Accordingly, stiffening anchor 210 matingly attaches to the distal end of landing gear strut 102.

Additionally, clamps 216 are attached about landing gear strut 102. As may be seen, each clamp 216 includes a plurality of nut and bolt pairs 302 for fastening a first clamp portion 216a of clamp 216 to a second portion 216b of clamp 216. Second portion 216b is integrally formed with the stiffening anchor 210 while first portion 216a is separable from it in the described embodiment.

Accordingly, stiffening anchor 210 may be attached to landing gear strut 102 by placing stiffening anchor 210 against landing gear strut 102, by placing first portion 216a against second portion 216b and by attaching nut and bolt pairs 302 thereto. Resultantly, first and second portions 216a and 216b securely form clamp 216 about landing gear strut 102.

While the described embodiment includes clamps 216 that have a completely separable first portion 216a, other types of clamps may also be used. For example, hinged clamps may be used wherein nut and bolt pairs are attached on only one side of the clamp portions 216a and 216b. In this embodiment, an unbolted portion of clamp 216 is rotatably connected by the hinge.

In operation, clamps 216 and outer curved portion 304 apply pressure to landing gear strut 102 wherein outer curved portion 304 distributes urging pressure along inner curved portion 116 of landing gear strut 102. Additionally, clamps 216 also apply some of the urging pressure. The combination of outer curved portion 304 and the clamps 216 sufficiently distribute urging pressure to allow up to 20,000 pounds of pressure to be applied to landing gear strut 102 without damaging it.

As is understood, the channel for receiving landing gear strut 102 by first and second portions 216a and 216b is sized to match or nearly match (but is sized slightly smaller) the circumference of landing gear strut 102. This allows clamp 216 to grab landing gear strut 102 securely when the nut and bolt pairs 302 are securely fastened.

Finally, as may be seen in FIG. 3, the clamp 216 formed at a distal end of stiffening anchor 210 is for abutting and pressing against landing gear hub 106b of wheel assembly 106. Accordingly, whenever an outward urging pressure is created by hydraulic ram 214 of FIG. 2, the clamp 216 formed at the distal end of stiffening anchor 210 also abuts and applies pressure against landing gear hub 106b.

FIG. 4 is a functional diagram of a landing gear assembly and a hydraulic aircraft strut removal tool system according to a preferred embodiment of the invention. Referring now to FIG. 4, the hydraulic aircraft strut removal tool 200 of FIG. 2 and the landing gear assembly 100 of FIG. 1 are shown generally at 400. Each of the previously described components is shown in addition to a hydraulic fluid source 402.

In the preferred embodiment, hydraulic fluid source 402 comprises a manually activated hydraulic pump. All known types of hydraulic systems may be used for the purposes of the described invention. In general, however, severely corroded strut assemblies can require as much as 20,000 pounds of pressure. Accordingly, the described embodiment includes a manually activated hydraulic pump that can deliver 20,000 pounds of pressure. Hydraulic fluid source 402 includes a handle 404 for pumping hydraulic fluid into fluid line 406. Fluid line 406 is connected to connector valve 215 to conduct hydraulic fluid into hydraulic ram 214. In general, handle 404 is actuated in the approximately vertical directions shown at 408.

As a result of receiving hydraulic fluid at connector valve 215, hydraulic ram 214 creates an outward urging pressure in the directions illustrated at 410a and 410b in FIG. 4. An operator of the hydraulic aircraft strut removal tool 200 continues to manipulate handle 404 in the directions 408 to continue to increase outward urging pressure in the directions 410a and 410b. Hydraulic ram 214 urges press sleeve 222 axially toward pivoting landing gear support 104. Press sleeve 222 of sliding press collar 212 translates the axial urging pressure in direction 410b to cause sliding press collar 212 to press against pivoting landing gear support 104.

Hydraulic ram 214 also urges stiffening anchor 210 in an outward direction 410a towards the distal end of the landing gear strut 102. Stiffening anchor 210 applies the outward urging pressure against landing gear strut 102 as discussed above. Specifically, the pressure is distributed along the inner curved portion 116 and along the portions that are in the grip of clamps 216.

Figure 5A:
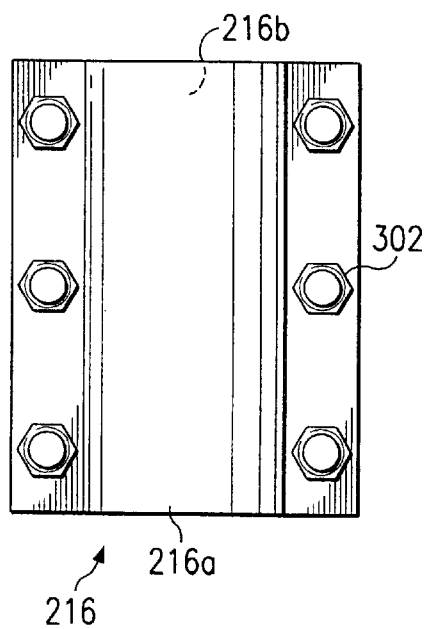
FIGS. 5A and 5B illustrate a top and a front view of a clamp according to the described embodiment of the invention.
Figure 5B:
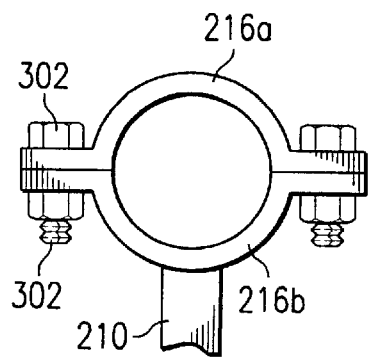

FIGS. 5A and 5B illustrate a top and a front view of a clamp according to the described embodiment of the invention. Referring now to FIG. 5, a plurality of nut and bolt pairs secure clamp portion 216a to 216b. When secured together, clamp portions 216a and 216b form a channel 504 for securely engaging landing gear strut 102. Referring now to FIG. 5B, clamp portion 216a is shown being attached to clamp portion 216b by nut and bolt pairs 302. Additionally, clamp portion 216b is integrally formed with stiffening anchor 210. Because clamp 216 is similar to sliding strut connector 220 is shape and form, the illustrations of FIGS. 5A, 5B and 6 also generally represent the layout of strut connector 220. One difference between the two that cannot readily be seen in the Figures is their channel size relative to the strut passing therethrough. Clamp 216 is made to securely grab a strut 102 while connector 220 is for allowing a strut 102 to freely pass through it.

Figure 6:
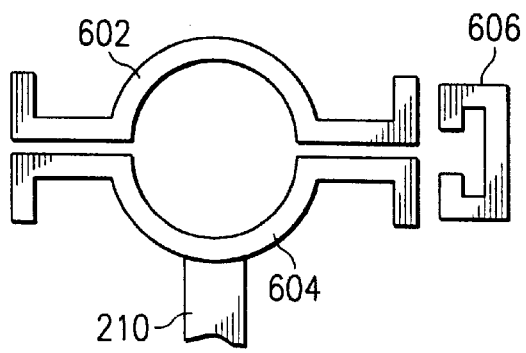
FIG. 6 is a front view of an alternate embodiment of a clamp.

FIG. 6 is a front view of an alternate embodiment of a clamp. Referring now to FIG. 6, an upper clamp portion 602 is formed to attach to a lower clamp portion 604 that is integrally formed with stiffening anchor 210. Instead of including nut and bolt pairs 302 to secure the upper and lower clamp portions, a sliding bracket 606 is used to secure the clamp portions as may be seen. As with the preferred embodiment, the diameter of the channel defined by the clamp portions is slightly smaller than the diameter of the strut in the general area where the clamp is to be attached so that the clamp may be secured thereto. Each embodiment of the clamps as well other known embodiments may be used either on the sliding strut connector 220 or the stiffening anchor 210.

Figure 7:
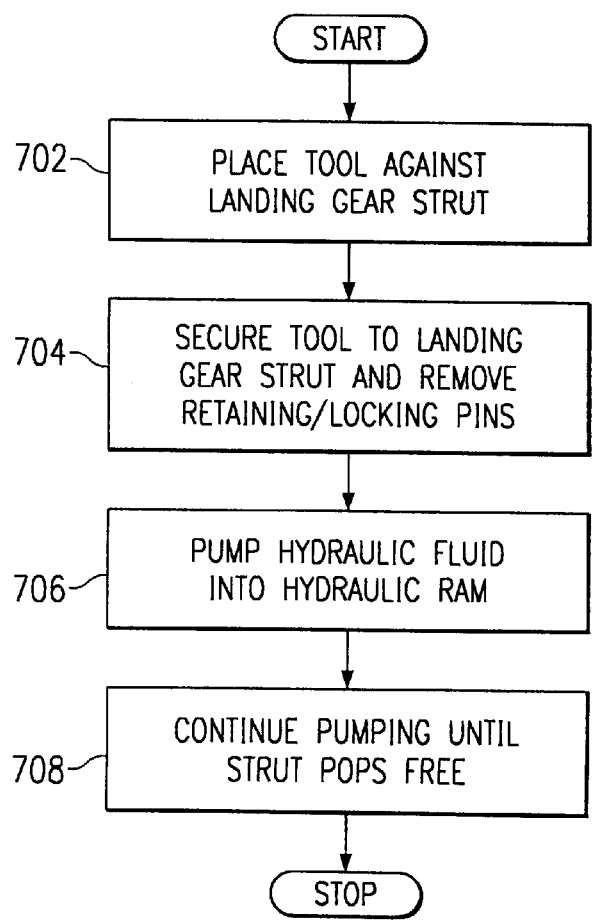
FIG. 7 illustrates a preferred embodiment of a method of practicing the present invention.

FIG. 7 illustrates a preferred embodiment of a method of practicing the present invention. Referring now to FIG. 7, a method of the present invention includes, in general, attaching a hydraulic aircraft strut removal tool 200 to a landing gear assembly 100, and applying hydraulic fluid to the hydraulic aircraft strut removal tool 200. The hydraulic fluid causes the tool to create an outward urging pressure to urge a landing gear strut 102 out from a pivoting landing gear support 104. The method further includes continuing to apply hydraulic fluid to the hydraulic aircraft strut removal tool 200 until the strut pops free from the corrosive grip of the pivoting landing gear support 104. Typically, a hydraulic pressure of twenty thousand pounds or less is required.

More specifically, the method includes placing stiffening anchor 210 of the hydraulic aircraft strut removal tool 200 against a distal end of landing gear strut 102 and the press sleeve 222 of hydraulic aircraft strut removal tool 200 against the proximate end of the landing gear strut 102 (step 702). Thereafter, nut and bolt pairs are used to secure clamp portions of the hydraulic aircraft strut removal tool 200 about the landing gear strut 102 (step 704). In the preferred embodiment, nut and bolt pairs are used to secure the hydraulic aircraft strut removal tool 200 to the landing gear strut. Other known methods of mechanically securing devices in a non-permanent manner are included. As a part of securing the hydraulic aircraft strut removal tool 200 to remove strut 102, strut retaining components such as locking pins should be removed in accordance with manufacturer's instructions. The step of removing the retaining component (s) can be done anytime before the strut removal tool 200 is actuated to remove the strut.

Thereafter, the pump handle 404 of the hydraulic fluid source 402 is actuated to provide hydraulic fluid to the hydraulic ram 214 (step 706). Upon receiving the hydraulic fluid, hydraulic ram 214 provides an outward urging force to urge the landing gear strut 102 away from pivoting landing gear support 104. The pump handle 404 is actuated to continue increasing hydraulic pressure (urging pressure) until landing gear strut 102 is urged free from pivoting landing gear support 104 (step 708).

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims. For example, while the described embodiment is directed towards removing landing gear struts from several different Cessna brand aircraft including the Cessna 172RG, 177RG, 182RG and 210RG in certain older year models, the teachings of the disclosure herein may be modified to apply to other makes and models of aircrafts and to other devices having a curved portion at a distal end of a piece needing a large urging force to remove it.

I claim:

1. An apparatus for removing a landing gear strut having an inner curved portion from a pivoting landing gear support, comprising:
   a stiffening anchor for distributing pressure along the curved portion of the landing gear strut and for securely gripping the landing gear strut;
   a press collar for slidingly containing a proximate end of the landing gear strut and for providing axial urging pressure against the pivoting landing gear support; and
   a hydraulic ram for creating an outward urging pressure to urge the landing gear strut axially away from the pivoting landing gear support.

2. The apparatus of claim 1 further including a hydraulic fluid source for supplying hydraulic fluid to actuate the hydraulic ram.

3. The apparatus of claim 1 wherein the stiffening anchor includes an outer curved portion formed to fit against an inner curved portion of the landing gear strut.

4. The apparatus of claim 1 wherein the stiffening anchor includes a plurality of clamps for securely gripping the landing gear strut.

5. The apparatus of claim 4 wherein a first clamp is formed to securely grip the landing gear strut approximately adjacent to a landing gear hub, the landing gear hub for attaching a wheel to the landing gear strut.

6. The apparatus of claim 5 wherein a second clamp is formed to securely grip the landing gear strut between the inner curved portion of the landing gear strut and a proximate end of the landing gear strut, wherein the proximate end attaches to a pivoting landing gear system.

7. The apparatus of claim 6 wherein the combination of the first clamp, the second clamp and the outer curved portion jointly distribute urging pressure provided by the hydraulic ram against the landing gear strut.

8. The apparatus of claim 1 wherein the stiffening anchor is formed between a first and a second clamp.

9. The apparatus of claim 8 wherein the combination of the first and second clamps and the stiffening anchor jointly distribute urging pressure along the landing gear strut.

10. The apparatus of claim 8 wherein the first clamp and the second clamp each include an attached portion and a separable portion wherein the attached portion is integrally formed with the apparatus.

11. The apparatus of claim 10 wherein the separable portion is attached to the attached portion by a plurality of nut and bolt pairs.

12. The apparatus of claim 11 wherein the separable portion is completely separable and wherein the nut and bolt pairs are attached on two sides of the first and second clamps.

13. The apparatus of claim 11 wherein the separable portion is permanently connected to the attached portion by a hinge.

14. The apparatus of claim 13 wherein only one side of the first and second clamps is secured with a nut and bolt pair.

15. A method for removing a landing gear strut from a pivoting landing gear system, comprising:
   placing a select hydraulic aircraft strut removal tool against the landing gear strut wherein the select tool is formed to engagingly mate with the landing gear strut so as to distribute removal pressure along the strut;
   securing the select tool against the strut; and
   providing hydraulic fluid to a hydraulic ram portion of the hydraulic aircraft strut removal tool until the landing gear strut is urged free from the pivoting landing gear system.

16. The method of claim 15 further including the step of fluidly coupling a hydraulic pump to the hydraulic ram portion.

17. The method of claim 16 wherein the step of providing hydraulic fluid includes pumping the hydraulic pump.

18. The method of claim 15 further including the step of securing the select hydraulic aircraft strut removal tool against and to the aircraft strut with a sliding bracket.

19. The method of claim 15 further including the step of securing the select hydraulic aircraft strut removal tool against and to the aircraft strut with a plurality of nut and bolt pairs.

* * * * *